United States Patent
Kato et al.

(10) Patent No.: US 9,161,215 B2
(45) Date of Patent: Oct. 13, 2015

(54) WIRELESS DEVICE, REGISTRATION SERVER AND METHOD FOR PROVISIONING OF WIRELESS DEVICES

(75) Inventors: Ryoji Kato, Kanagawa (JP); Shingo Murakami, Kanagawa (JP); Toshikane Oda, Tokyo (JP); Shinta Sugimoto, Kanagawa (JP)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 16 days.

(21) Appl. No.: 13/985,459

(22) PCT Filed: Feb. 14, 2011

(86) PCT No.: PCT/SE2011/050154
§ 371 (c)(1),
(2), (4) Date: Aug. 14, 2013

(87) PCT Pub. No.: WO2012/112085
PCT Pub. Date: Aug. 23, 2012

(65) Prior Publication Data
US 2013/0326603 A1   Dec. 5, 2013

(51) Int. Cl.
*H04L 29/00* (2006.01)
*H04W 12/04* (2009.01)
(Continued)

(52) U.S. Cl.
CPC ............ *H04W 12/04* (2013.01); *H04L 9/0866* (2013.01); *H04L 2209/80* (2013.01); *H04W 4/005* (2013.01)

(58) Field of Classification Search
CPC . H04L 9/0866; H04L 2209/80; H04W 12/04; H04W 4/005

USPC ................................ 726/6; 713/171; 380/270
See application file for complete search history.

(56) References Cited

U.S. PATENT DOCUMENTS

| 2002/0174335 A1* | 11/2002 | Zhang et al. ................... 713/168 |
| 2006/0154646 A1* | 7/2006 | Tung ............................. 455/411 |
| 2007/0192602 A1* | 8/2007 | Blom et al. .................... 713/169 |

(Continued)

FOREIGN PATENT DOCUMENTS

| FR | WO2010139780 | * 12/2010 | ............. H04L 29/06 |
| WO | 2009154020 A1 | 12/2009 | |
| WO | 2010102236 A2 | 9/2010 | |

OTHER PUBLICATIONS

3rd Generation Partnership Project; Technical Specification Group Services and System Aspects; Feasibility study on the security aspects of remote provisioning and change of subscription for Machine to Machine (M2M) equipment (Release 9), 2GPP TR 33.812 V9.2.0 (2010), 3rd Generation Partnership Project (3GPP), Mobile Competence Centre, XP050441986, 87 pages.

*Primary Examiner* — Michael Pyzocha
(74) *Attorney, Agent, or Firm* — Rothwell, Figg, Ernst & Manbeck, P.C.

(57) ABSTRACT

The present invention relates to auto-provision of wireless devices. A wireless device (1) has a device identifier and a first private key generated from the device identifier. A registration server (5) has an operator identifier and a second private key generated from the operator identifier. The wireless device (1) transmits the device identifier to the registration server (5), and the registration server (5) transmits a subscriber identifier to the wireless device (1). The wireless device (1) generates a shared key based on the operator identifier and the first private key, and the registration server (5) generates the shared key based on the device identifier and the second private key.

18 Claims, 6 Drawing Sheets

(51) Int. Cl.
*H04L 9/08* (2006.01)
*H04W 4/00* (2009.01)

(56) References Cited

U.S. PATENT DOCUMENTS

| | | | |
|---|---|---|---|
| 2007/0258595 A1* | 11/2007 | Choy | 380/278 |
| 2007/0275717 A1* | 11/2007 | Edge et al. | 455/434 |
| 2008/0076386 A1* | 3/2008 | Khetawat et al. | 455/410 |
| 2008/0095361 A1* | 4/2008 | Wifvesson et al. | 380/44 |
| 2008/0260149 A1* | 10/2008 | Gehrmann | 380/247 |
| 2009/0285107 A1* | 11/2009 | Sakurai et al. | 370/242 |
| 2009/0307492 A1* | 12/2009 | Cao et al. | 713/169 |
| 2010/0130167 A1* | 5/2010 | Bennett et al. | 455/411 |
| 2011/0246527 A1* | 10/2011 | Bitting et al. | 707/784 |
| 2011/0295996 A1* | 12/2011 | Qiu et al. | 709/224 |
| 2012/0109835 A1* | 5/2012 | Barefoot et al. | 705/319 |
| 2012/0115443 A1* | 5/2012 | Ait Aissa et al. | 455/411 |
| 2012/0173743 A1* | 7/2012 | Yu | 709/228 |
| 2013/0024909 A1* | 1/2013 | Morita | 726/1 |
| 2013/0208703 A1* | 8/2013 | Sugimoto et al. | 370/331 |

* cited by examiner

WIRELESS DEVICE, REGISTRATION SERVER AND METHOD FOR PROVISIONING OF WIRELESS DEVICES

CROSS REFERENCE TO RELATED APPLICATION(S)

This application is a 35 U.S.C. §371 National Phase Entry Application from PCT/SE2011/050154, flied Feb. 14, 2011, designating the United States, the disclosure of which is incorporated herein in its entirety by reference.

TECHNICAL FIELD

The present invention relates to auto-provisioning of wireless devices.

BACKGROUND

Figure 6:
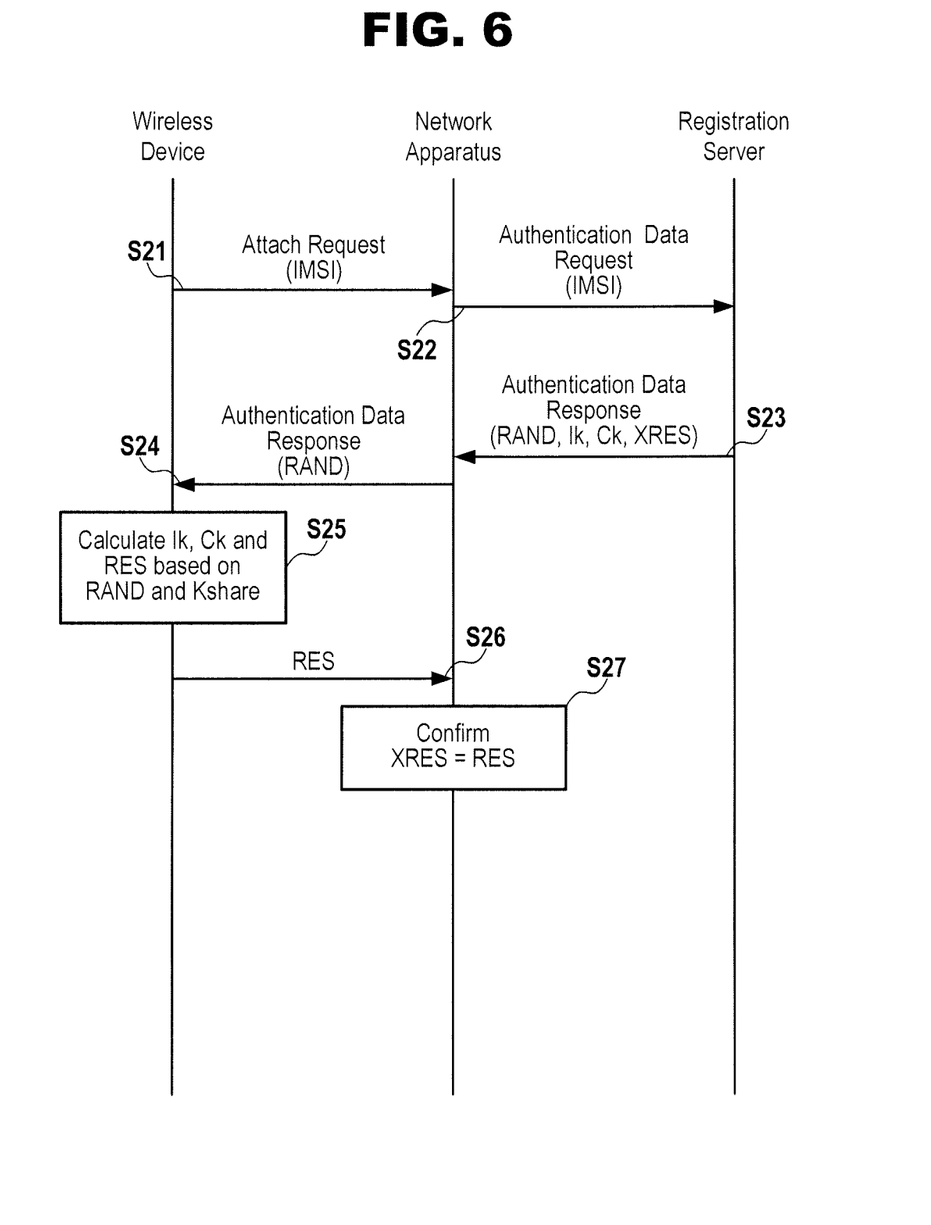
FIG. 6 is a sequence diagram of an attach procedure.

In current wireless networks, wireless devices need to perform an attach procedure to initiate communication through a network. FIG. 6 shows an outline of the attach procedure in accordance with "General Packet Radio Service (GRPS) enhancement for Evolved Universal Terrestrial Radio Access Network (E-UTRAN) access (Release 9)", 3GPP TS 23.401 V9.3.0. For simplification, a registration server is expressed as a single apparatus; however, it may be a plurality of apparatuses.

In step S21, a wireless device transmits an attach request signal including an subscriber identifier called International Mobile Subscriber Identifier (IMSI) assigned to the wireless device to a network apparatus such as Serving GRPS Support Node (SGSN). In step S22, the network apparatus transmits an authenticating data request signal to a registration server of a home network of the wireless device. The network apparatus determines the home network of the wireless device based on the IMSI included in the attach request signal.

In step S23, the registration server transmits an authentication data response signal including a random value RAND, two keys Ik and Ck, and an expected response value XRES to the network apparatus. Here, two keys Ik and Ck as well as the expected response value XRES are calculated based on the random value RAND and a shared key $K_{share}$ that is shared between the wireless device and the registration server in advance.

In step S24, the network apparatus transmits an authentication data response signal including the random value RAND to the wireless device. In step S25, the wireless device calculates a response value RES and the two keys Ik and Ck based on the random value RAND and the shared key $K_{share}$. In step S26, the wireless device transmits the response value RES to the network apparatus. In step S27, the network apparatus compares whether the expected response value XRES is the same as the response values RES, and if they are the same, the attachment procedure successfully completes.

As explained above, the shared key $K_{share}$ for the wireless device needs to be predetermined, and stored in both the wireless device and the registration server before starting the attachment procedure. Further, the IMSI needs to be assigned to the wireless device from a home operator, which is an operator of the home network of the wireless device, and stored in the wireless device before starting the attachment procedure. Currently, the shared key $K_{share}$ and the IMSI are stored in a Subscriber Identifier Module (SIM) card, which can be inserted into the wireless device, and provided to a user of the wireless device when the user subscribes to the home network. Thus, a provisioning of the wireless device is performed on an off-line basis.

To enable a remote provisioning of wireless devices, "Feasibility study on the security aspects of remote provisioning and change of subscription for Machine to Machine (M2M) equipment (Release 9)", 3GPP TR 33.812 V9.2.0, proposes usage of a registration operator.

However, to communicate with an apparatus in the registration operator, wireless devices need to have a shared key with the apparatus in the registration operator in advance. Furthermore, the wireless devices need to have a Provisional Connectivity Identification (PCID), which has the same format as the IMSI, in advance. If there are a number of registration operators for each country or area, manufacturers of wireless devices need to store a plurality of shared keys, each of which corresponds to a registration operator, in their wireless devices at production. Further, according to the current proposal, selecting and/or changing a home operator requires an off-line procedure, and it is not possible to select and change the home operator on an on-line basis.

SUMMARY

The present invention has been made in view of the above described problem, and provides a method for provisioning of a wireless device, which does not have a shared key with a network and a subscriber identifier assigned by the network. Further, the present invention provides a wireless device and a registration server used in the method.

In accordance with a first aspect of the present invention, a wireless device includes a storage unit, a communication unit and a shared key generating unit.

The storage unit is configured to store a device identifier and a private key generated from the device identifier. The communication unit is configured to transmit a default subscriber identifier corresponding to an operator selected by a user and the device identifier to a network, and receive a first subscriber identifier from the network in response to transmitting the default subscriber identifier. The shared key generating unit is configured to generate a first shared key based on the private key and an operator identifier corresponding to the operator.

In accordance with a second aspect of the present invention, a registration server includes a storage unit, a subscriber identifier management unit, a communication unit and a shared key generating unit.

The storage unit is configured to store an operator identifier of the network and a private key generated from the operator identifier. The subscriber identifier management unit is configured to assign a subscriber identifier to a wireless device in response to a request signal from the wireless device. The communication unit is configured to transmit the subscriber identifier to the wireless device. The shared key generating unit is configured to generate a shared key based on the private key and a device identifier received from the wireless device.

In accordance with a third aspect of the present invention, a method for provisioning of a wireless device which has a first private key generated from a device identifier of the wireless device includes the steps of transmitting, from the wireless device, a request signal including a default subscriber identifier corresponding to a network selected by a user to a registration server of the network, the registration server including a second private key generated from an operator identifier assigned to the network; assigning, at the registration server, a subscriber identifier to the wireless device; transmitting, from the registration server, the subscriber identifier to the wireless device; generating, at the wireless device, a shared key based on the first private key and the operator identifier; and generating, at the registration server, the shared key based on the second private key and the device identifier received from the wireless device.

In accordance with a fourth aspect of the present invention, a computer program stored in a computer readable medium causes a computer to function as the registration server.

Further objects and advantages of the present invention will be apparent from the following description of the preferred embodiments of the invention as illustrated in the accompanying drawings.

DETAILED DESCRIPTION

Figure 1:
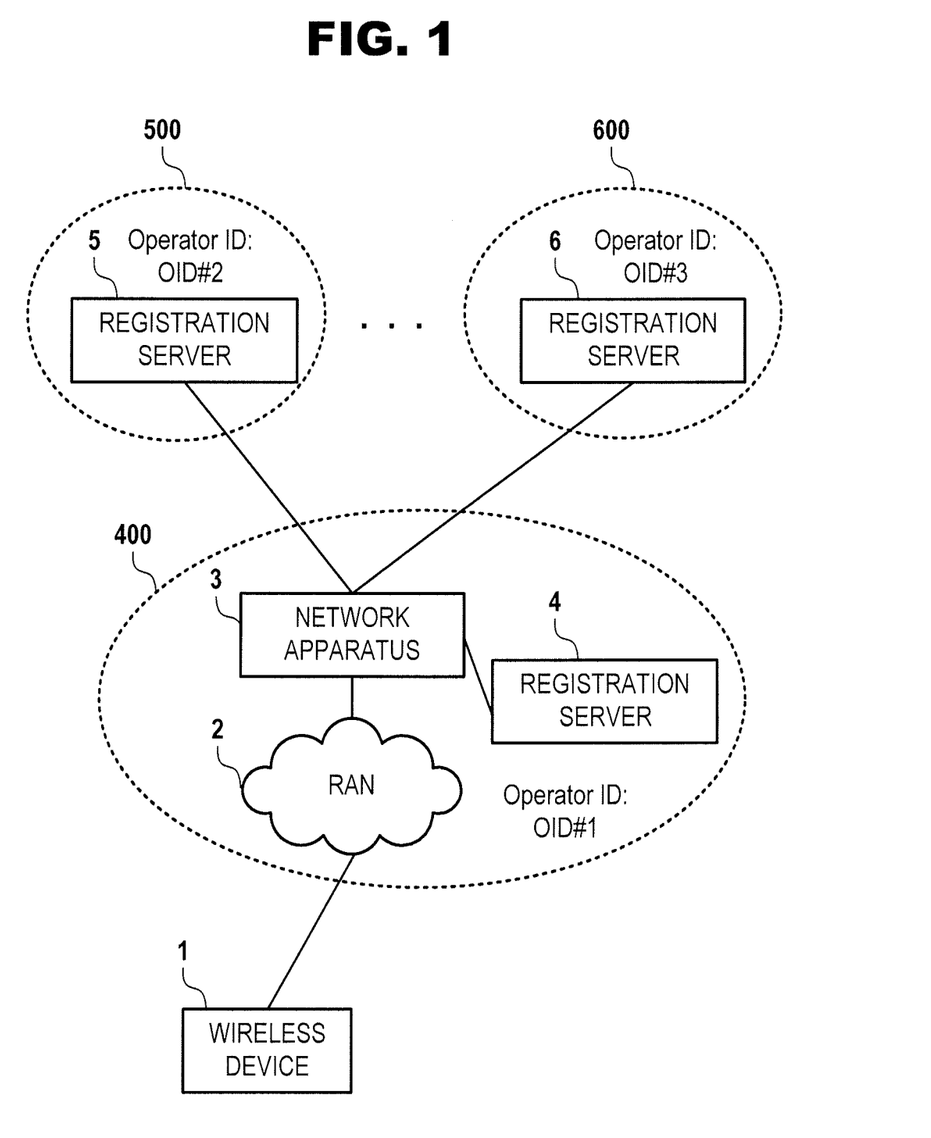
FIG. 1 shows an exemplary embodiment of a system according to the invention.

FIG. 1 shows an exemplary embodiment of a system according to the invention. In FIG. 1, three networks 400, 500 and 600 are depicted for explanation purpose. OID#1 is assigned as an operator identifier for an operator of a network 400, OID#2 is assigned as an operator identifier for an operator of a network 500, and OID#3 is assigned as an operator identifier for an operator of a network 600. The operator identifier may be a combination of a Mobile Country Code (MCC) and a mobile network code (MNC).

In FIG. 1, a network 400 includes a radio access network (RAN) 2, a network apparatus 3, and a registration server 4. The network apparatus 3 is connected to both the RAN 2 and the registration sever 4. Further, the network apparatus 3 is connected to registration servers 5 and 6 of networks 500 and 600, respectively. The networks 500 and 600 also include RANs and network apparatuses; however, they are not shown in FIG. 1 for simplification.

The registration servers 4 to 6 generate data required for provisioning of wireless devices called MCIM objects including an IMSI and a shared key. Functions of the registration server 4 to 6 are the same, and may be implemented in a Home Location Register (HLR). Each registration sever may be implemented in a single apparatus or in a plurality of apparatuses. The network apparatus 3 transfers messages between the wireless device 1 and the registration servers 4 to 6. Functions of the network apparatus 3 may be implemented in a SGSN, a Mobile Switching Centre (MSC), a Mobile Management Entity (MME) or a Visitor Location Register (VLR).

Figure 2:
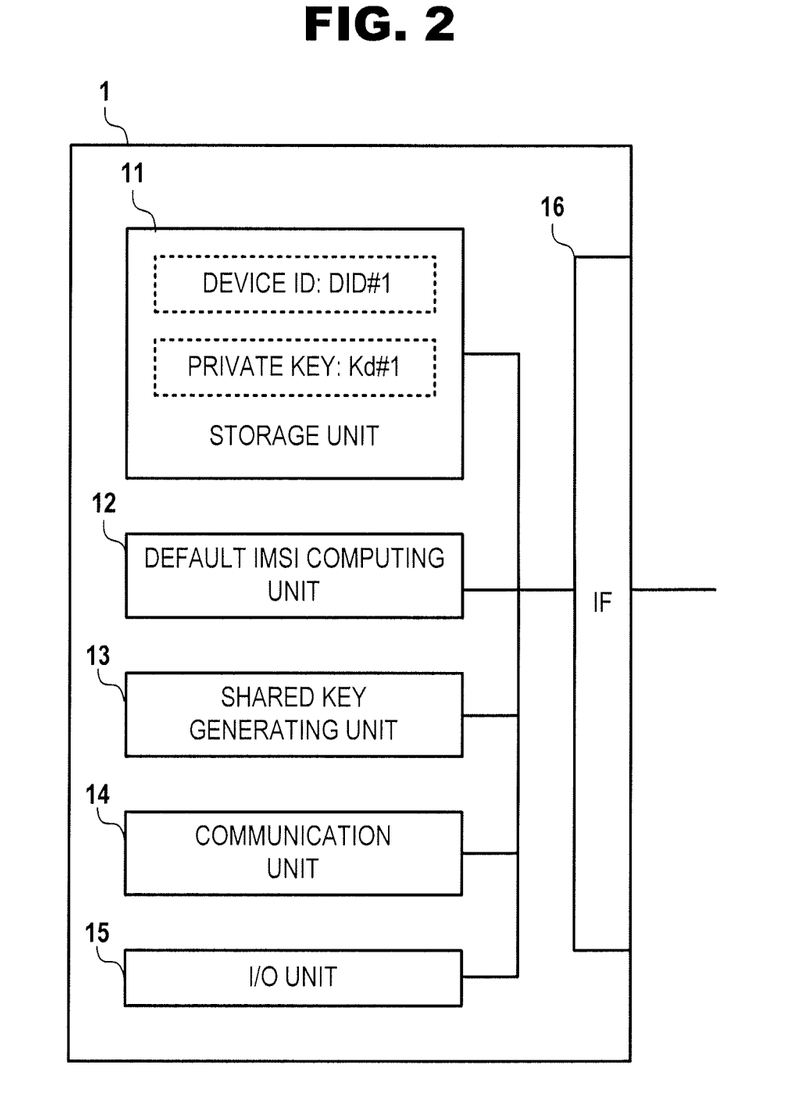
FIG. 2 is a block diagram of a wireless device.

FIG. 2 is a block diagram of the wireless device 1. As shown in FIG. 2, the wireless device 1 has a storage unit 11, which stores a device identifier assigned to the wireless device, such as International Mobile Equipment Identifier (IMEI), and a private key generated from the device identifier. In FIG. 2, DID#1 is assigned as the device identifier to the wireless device 1, Kd#1 is generated from DID#1, and DID#1 and Kd#1 are stored in the storage unit 11 in advance. The device identifier may be assigned by a manufacturer of the wireless device 1. The calculation of the private key may be performed by the manufacturer of the wireless device 1, or may be performed by a trusted third party, which is normally referred to as a Private Key Generator (PKG).

A default IMSI computing unit 12 computes a default IMSI based on an operator identifier input to the wireless device by a user of the wireless device 1. The default IMSI is used to access a registration server of a network selected by the user. The user can input the operator identifier directly using an I/O unit 15. Further, the user can input the operator identifier by selecting the operator identifier displayed on the I/O unit 15. In this case, the storage unit 11 stores a list of operator identifiers associated with operator names.

A shared key generating unit 13 generates a tentative shared key based on the private key Kd#1 and the operator identifier input by the user. A communication unit 14 is responsible for handling messages exchanged with registration servers. An interface unit 16 is configured to connect to the RAN 2.

Figure 3:
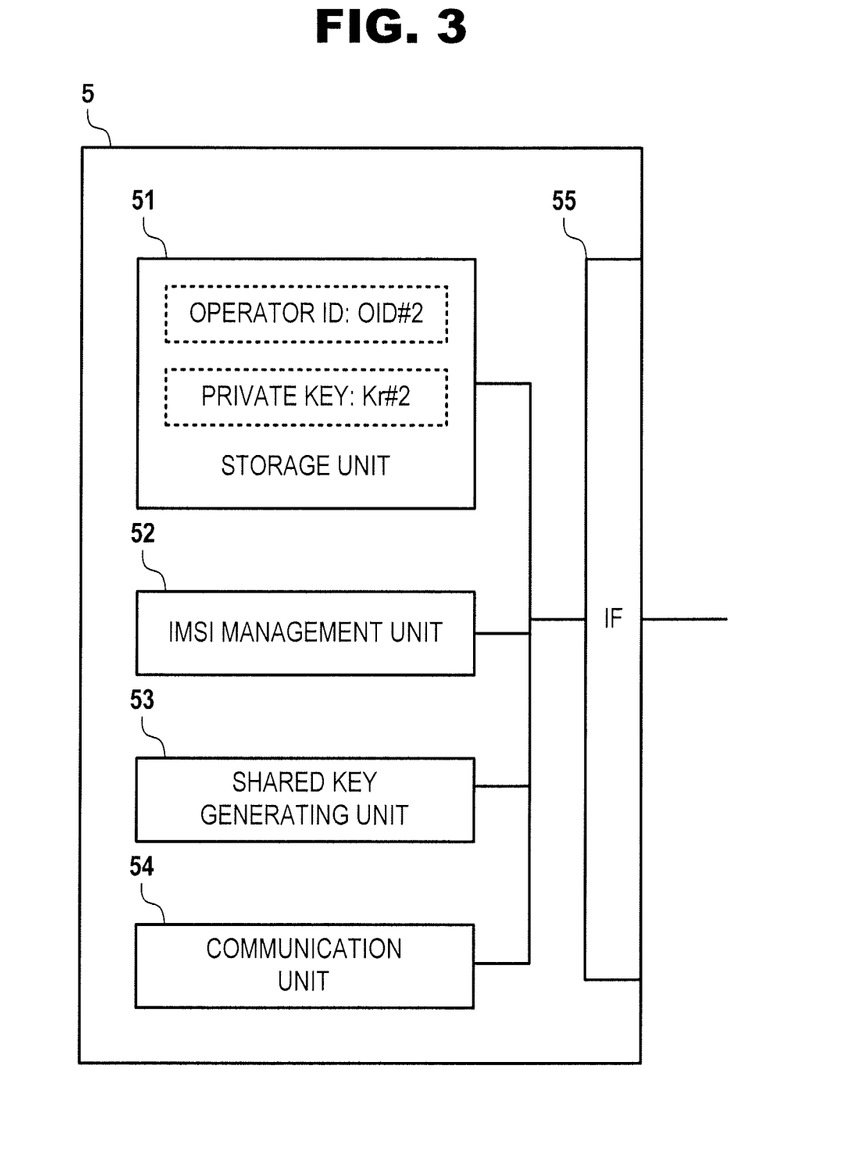
FIG. 3 is a block diagram of a registration server.

FIG. 3 is a block diagram of the registration server 5 in the network 500. It is noted that functional blocks of registration server 4 and 6 are basically the same as the registration server 5. The registration server 5 has a storage unit 51, which stores the operator identifier OID#2 assigned to the network 500 and a private key generated from the operator identifier OID#2. In FIG. 3, Kr#2 is generated from the operator identifier OID#2. The calculation of the private key may be performed by the manufacture of wireless devices, or may be performed by the trusted third party, which is normally referred to as the Private Key Generator (PKG).

An IMSI management unit 52 manages IMSIs used in the network 500, and assigns a tentative IMSI to a wireless device, which transmits a request signal including a default IMSI of the network 500. A shared key generating unit 53 generates a tentative shared key with the wireless device based on a private key Kr#2 stored in the storage unit 51 and the device identifier of the wireless device. A communication unit 54 is responsible for handling messages exchanged with wireless devices. The messages are transmitted and received via an interface unit 55.

Figure 4:
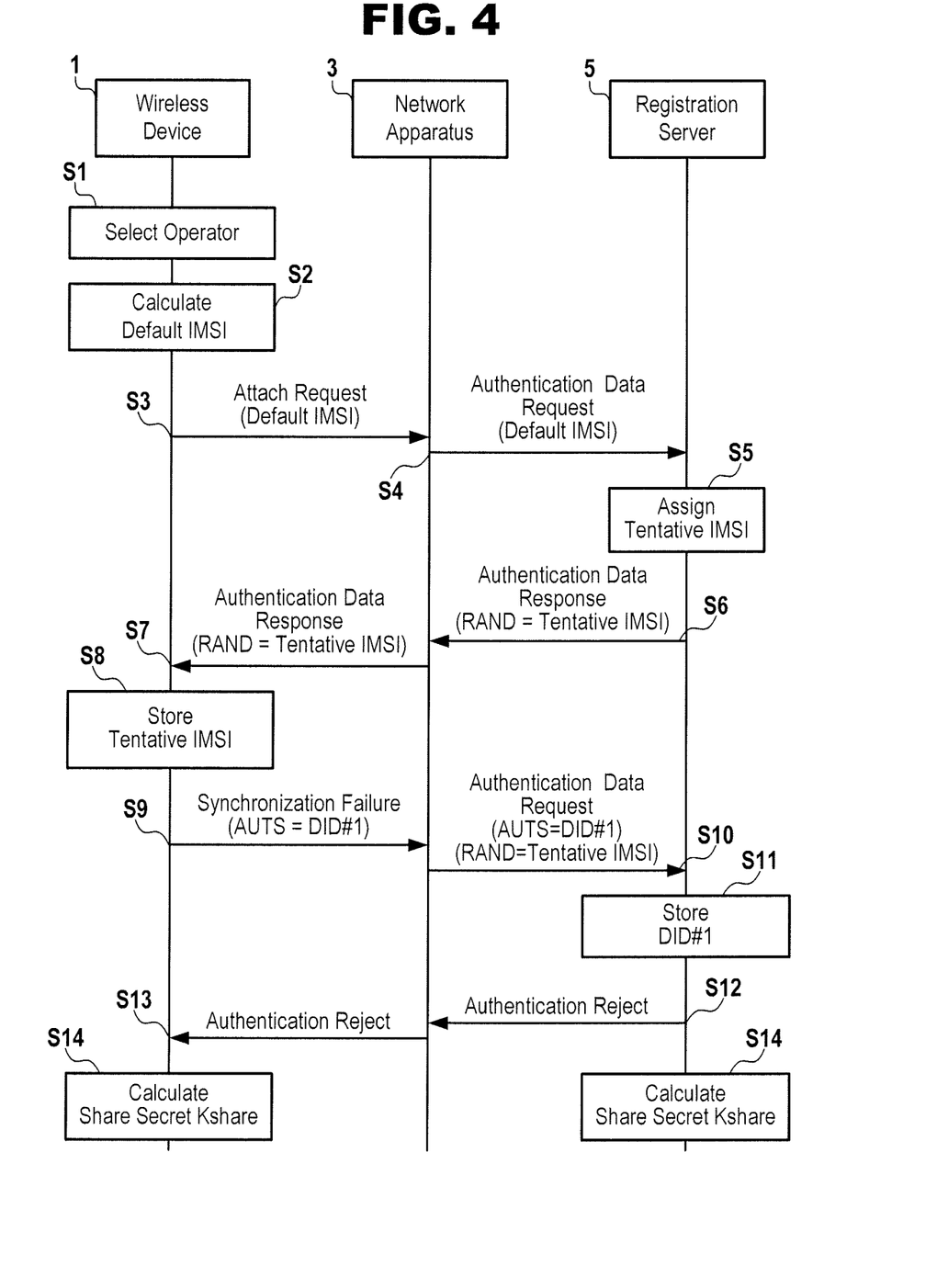
FIG. 4 is a sequence diagram according to the embodiment.

FIG. 4 is a sequence diagram for providing the tentative IMSI to the wireless device 1 and generating a tentative shared key $TK_{share}$ at both the wireless device 1 and the registration server 5, in case the user of the wireless device 1 selects the network 500 as the home operator. In the embodiment, the sequence uses signals specified in "3G Security; Security architecture (Release 10)", 3GPP TS 33.102 V10.0.0. However, it is possible to use other signals specified in other standards. Further, it is possible to use original signals.

In step S1, the user selects a home operator of the wireless device 1 by inputting the operator identifier of the home network. In this example, the user inputs OID#2 to the wireless device 1 to select the network 500 as the home network using the I/O unit 15. Instead of inputting the operator identifier by the user, the I/O unit 15 may display a list of the network operators, and the user may select one of them. The list may be stored in the storage unit 11 in advance. Since each base station broadcasts an operator identifier of their network, the communication unit 14 may generate the list of operator identifies based on received radio signals.

In step S2, the default IMSI computing unit 12 computes a default IMSI to access the registration server 5 of the network 500, which is selected as the home operator by the user. The default IMSI is a special IMSI used for the sequence, and computed, for example, by adding a predetermined number to the operator identifier. For example, if the predetermined number is 0000000000 and the operator identifier is AAABB, then the default IMSI computing unit 12 generates AAABB0000000000 as the default IMSI. Further, it may be computed from the operator identifier using a predetermined algorithm. For example, the default IMSI computing unit 12 generates AAABBAAABBAAABB as the default IMSI from the operator identifier AAABB, in case the algorithm is to repeat the operator identifier 3 times. The algorithm is predetermined, and each registration server stores a default IMSI used in its network.

In step S3, the communication unit 14 transmits an attach request signal including the default IMSI to the network apparatus 3. In step S4, the network apparatus 3 receives the attach request signal, and transmits an authentication data request signal including the default IMSI from the wireless device 1 to the registration server 5 because the default IMSI is one used in the network 500. In step S5, the communication unit 54 receives the authentication data request signal from the network apparatus 3, and the IMSI management unit 52 assigns the tentative IMSI for the wireless device 1 in response to the request from the wireless device 1 via the network apparatus 3. In step S6, the communication unit 54 sets the tentative IMSI in a RAND field of an authentication data response signal, and transmits the authentication data response signal to the network apparatus 3. In step S7, the network apparatus 3 sends the authentication data response signal to the wireless device 1.

In step S8, the communicating unit 14 receives the authentication data response signal from the network apparatus 3, and stores the tentative IMSI in the storage unit 11. In step S9, the communicating unit 14 sets the device identifier DID#1 in an AUTS field in a synchronisation failure signal, and transmits the synchronisation failure signal to the network apparatus 3. Because of the synchronisation failure, the network apparatus 3 transmits an authentication data request signal to the registration sever 4 to inform of the synchronisation failure in accordance with the standard in step S10. As shown in FIG. 4, the networks apparatus 3 copies a value in the AUTS field of the received synchronisation failure signal into an AUTS field of the authentication data request signal in step S10. Further, the network apparatus 3 sets the tentative IMSI of the authentication data response signal sent in step S7 in the RAND field of the authentication data request signal in accordance with the standard in step S10.

In step S11, the communication unit 54 stores the device identifier DID#1 of the wireless device 1 included in the authentication data request signal in the storage unit 51. In step S12, the communication unit 54 transmits an authentication reject signal to the network apparatus 3, and the network apparatus 3 transmits an authentication reject signal to the wireless device 1, in step S13. In step S14, the shared key generating unit 13 of the wireless device 1 calculates a tentative shared key $TK_{share}$ from the private key Kd#1 and the operator identifier OID#2. Further, in step S14, the shared key generating unit 53 of the registration server 4 also calculates the tentative shared key $TK_{share}$ from the private key Kr#2 and the device identifier DID#1.

Since the private key Kd#1 is generated from the device identifier DID#1, and the private key Kr#2 is generated from the operator identifier OID#2, the same values can be obtained for the tentative shared key $TK_{share}$ at both the wireless device 1 and the registration server 5 using appropriate key generating algorithm, for example, disclosed in "Identity-Based Cryptography Standard (IBCS) #1: Supersingular Curve Implementations of the BF and BB1 Cryptosystems", RFC5091, and "Draft Standard for Identity-based Public-key Cryptography Pairing" IEEE P1363.3.

With the sequence above, the wireless device 1 obtains the tentative IMSI, and shares the shared key $TK_{share}$ with the registration server 5. Thus, the wireless device 1 can access the registration server 5 using the tentative IMSI and the tentative shared key $TK_{share}$ in accordance with the attachment procedure in FIG. 5, and downloads MCIM objects including an IMSI and a shared key $K_{share}$ from the registration server 5 to complete the on-line provision. After downloading the MCIM objects, the wireless device 1 uses the IMSI and the shared key $K_{share}$ included in the MCIM objects for later communication. The registration serve 5 may assign a period of validity for a tentative IMSI. In this case, the registration serve 5 may invalidate the tentative IMSI, if there is no access using the tentative IMSI within the period.

The wireless device 1 may uses the tentative IMSI and the tentative shared key $TK_{share}$ for later communication without downloading the MCIM objects including the IMSI and the shared key $K_{share}$. However, from a security view point, the wireless device may obtain a new IMSI and a new share secret key.

With the configuration above, shared keys and subscriber identifiers, e.g. IMSI, does not need to store wireless devices and registration serves in advance. Only the private key generated from the device is stored in the wireless device in advance, and only the private key generated from the operator identifier is stored in the registration server in advance. Because a shared key with a network is not required to store in the wireless device in advance, the user of the wireless device can select and change the home operator on an on-line basis. Further, according to the sequence in FIG. 4, messages used between the wireless device 1 and the registration server are in accordance with the standard. Thus, no modification is required for intermediate apparatuses including the network apparatus 3, which transfers messages.

Further, according to the invention, on-line provision of wireless devices is available without using the registration operator. However, it is possible to use the registration operator. In this case, the user selects the registration operator in step S1 of FIG. 1, and after calculating the tentative shared key $TK_{share}$ in step S14, the wireless device initiates the procedure described in "Feasibility study on the security aspects of remote provisioning and change of subscription for Machine to Machine (M2M) equipment (Release 9)", 3GPP TR 33.812 V9.2.0, to obtain MCIM objects.

In the sequence shown in FIG. 4, the user selects the home network in step S1. However, the invention is not limited to it. For example, the user may input an operator identifier, which acts as a substitute of the home operator in step S1. In this case, the registration server of the substitute operator generates the tentative IMSI of the home network in step S5. Further, the registration server of the substitute operator transmits the tentative shared secret $TK_{share}$ generated in step S14 to a registration sever of the home network using a secure communication channel. After step S14, the wireless device 1 can access the registration server of the home network using the tentative IMSI, and downloads MCIM objects including an IMSI and a shared key $K_{share}$ from the registration server of the home network. Further, in the sequence of FIG. 4, the wireless device 1 transmits the device identifier in step S9, however; the wireless device 1 may transmit the device identifier in Step 3.

Further, in the sequence shown in FIG. 4, the user inputs the operator identifier of a selected operator and the default IMSI computing unit 12 generates the default IMSI corresponding to the operator from the operator identifier. However, the user can enter the default IMSI into the wireless device 1 directly. In this case, the shared key generating unit 13 obtains the operator identifier corresponding to the selected operator from the default IMSI. Further, the operator identifier may be the same as the default IMSI.

The sequence in FIG. 4 assumes private keys are generated by one PKG, and stored in wireless devices and registration servers in advance. In this case, registration servers store one private key generated from the operator identifier of the network, because the same key generation algorithm and the same parameters are used for generating all private keys.

However, in the case where private keys of wireless devices are generated and stored in wireless devices by each manufacturer of wireless devices independently, the key generation algorithms and/or parameters are different among manufacturers. In this case, registration servers need to store a plurality of private keys, each of which corresponds to a manufacturer of wireless devices, in the storage unit 51. Each private key stored in the storage unit 51 is generated from the same operator identifier, but the key generation algorithm and/or parameters are different depending on the manufacturers. In this case, the shared key generating unit 54 determines the manufacturer of the wireless device based on the device identifier, and selects one private key corresponding to the determined manufacturer from the plurality of private keys stored in the storage unit 51. Then, the shared key generating unit 51 identifies the key generation algorithm and/or parameters based on the determined manufacturer, and calculates the tentative shared key $TK_{share}$.

Figure 5:
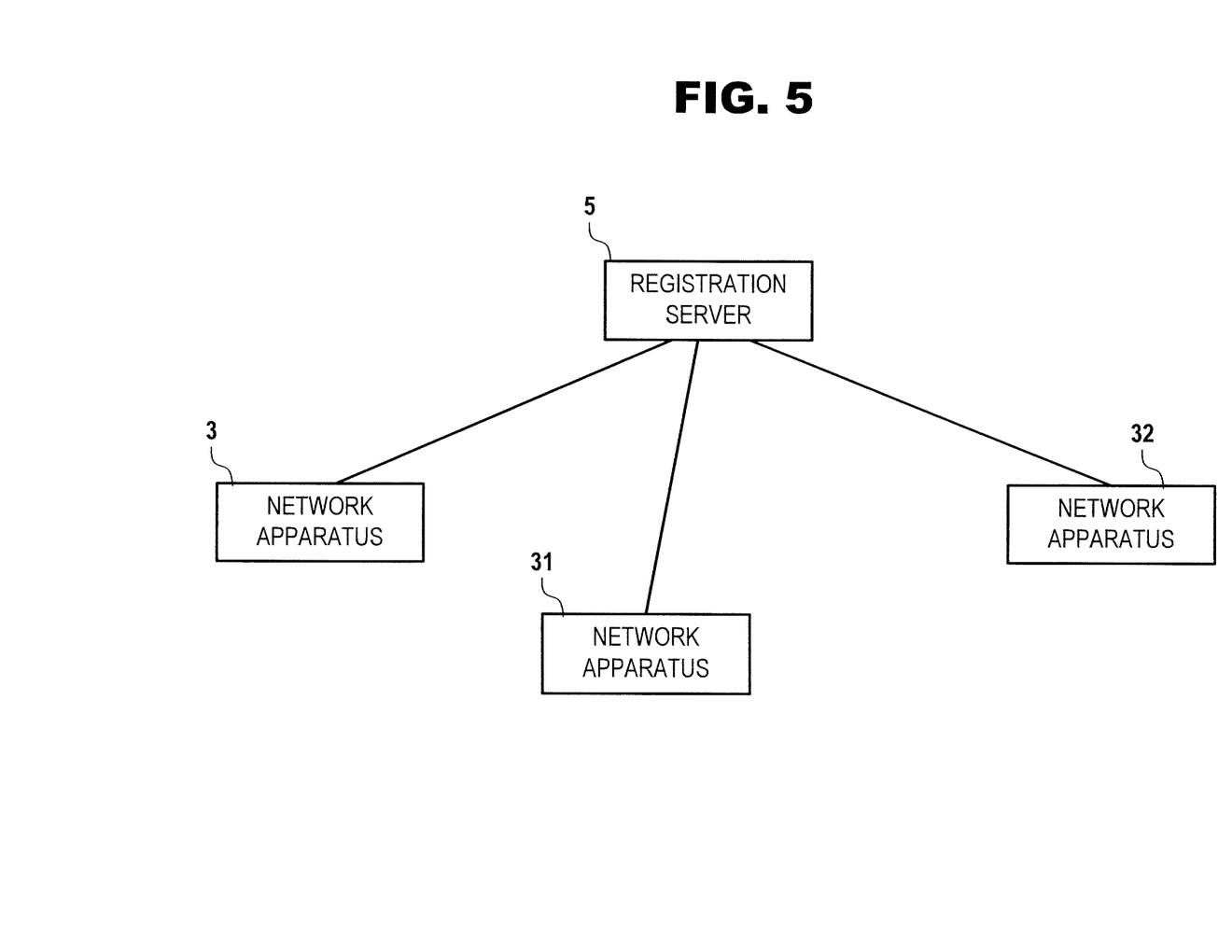
FIG. 5 is a explanation drawing about DoS attacks.

FIG. 5 is an explanation drawing about DoS attacks. The registration server 5 may be targeted by DoS attacks using the default IMSI via network apparatuses 3, 31 and 32. Thus, the communication unit 54 determines a network apparatus, which transfers messages of DoS attacks, based on the number of messages in a predetermined period. More specifically, if a network apparatus transfers more messages than a predetermined threshold in a predetermined period, the registration server 5 determines that the network apparatus is transferring messages of a DoS attack. In this case, communication unit 54 of the registration server 5 may ignore messages from the determined network apparatus. Or the registration server 5 may not respond to messages from the determined network apparatus for at least a predetermined period. In this case, the registration server may respond to some messages after the DoS attack has stopped. The registration server 5 also determines the end of the DoS attack based on the number of messages in a predetermined period.

Further, between steps S6 and S10 in FIG. 4, the communication unit 54 does not have to keep resources for waiting for the authentication data request signal from the networks apparatus in step 10, because a combination of the device identifier and the tentative IMSI is included in the authentication data request signal. This configuration can reduce the load on the registration server 5 in the case of DoS attacks.

Many modifications and variations will be apparent to those of ordinary skilled in the art. The present embodiments were chosen and described in order to best explain the principles of the invention. It should be understood that the present invention is not limited to the specific embodiments described in the specification, except as defined in the appended claims.

Further, the invention may be achieved by a program, which causes a computer or computer system to function as the registration server 5 or the wireless device 1. Programs defining functions on the invention can be delivered to a computer or a computer system using non-statutory computer-readable storage media or via a network. It should be understood the invention may be implemented by software, hardware or a combination of software and hardware.

The invention claimed is:

1. A wireless device, comprising:
   a memory;
   a processor coupled to the memory, wherein the processor includes:
   a storage unit configured to store a device identifier and a private key generated from the device identifier;
   a communication unit configured to transmit to a network (i) a default subscriber identifier corresponding to an operator selected by a user and (ii) the device identifier to a registration server, and receive a first subscriber identifier from the registration in response to transmitting the default subscriber identifier; and
   a shared key generating unit configured to generate a first shared key based on the private key and an operator identifier corresponding to the operator, and wherein the wireless device prevents downloading machine-to-machine communications identity module (MCIM) objects from a registration server.

2. The wireless device according to claim 1, further comprising a default subscriber identifier computing unit configured to compute the default subscriber identifier based on the operator identifier input or selected by the user.

3. The wireless device according to claim 1, wherein the operator identifier is obtained from a received radio signal.

4. The wireless device according to claim 1, wherein the shared key generating unit is configured to obtain the operator identifier from the default subscriber identifier input or selected by the user.

5. The wireless device according to claim 1, wherein the device identifier is transmitted to the registration server in response to receiving the first subscriber identifier.

6. The wireless device according to claim 1, wherein the communication unit is further configured to access the registration server using the first shared key and the first subscriber identifier, and download a second subscriber identifier and a second shared key.

7. The wireless device according to claim 1, wherein the device identifier is transmitted to the registration server using a signal informing of a synchronisation failure.

8. The wireless device according to claim 1, wherein a network operator to the network is selected from a list of network operators, wherein the list of network operators is generated by the communication unit based on received signals.

9. The wireless device according to claim 1, wherein the wireless device communicates with a registration server via a network that includes a RAN.

10. A registration server used in a network, comprising:
    a memory;
    a processor coupled to the memory, wherein the processor includes:
    a storage unit configured to store an operator identifier of the network and a private key generated from the operator identifier;
    a subscriber identifier management unit configured to assign a subscriber identifier to a wireless device in response to a request signal from the wireless device;
    a communication unit configured to transmit the subscriber identifier to the wireless device; and
    a shared key generating unit configured to generate a shared key based on the private key and a device identifier received from the wireless device, and wherein the wireless device prevents downloading machine-to-machine communications identity module, MCIM, objects from a registration server.

11. The registration server according to claim 10, wherein the storage unit is further configured to store a plurality of private keys generated from the operator identifier, and the shared key generating unit is further configured to select one private key used to generate the shared key based on the device identifier from the plurality of private keys.

12. The registration server according to claim 10, wherein the subscriber identifier transmitted to the wireless device is set in a random field of a signal used for authenticating wireless devices.

13. The registration server according to claim 10, wherein the communication unit is further configured not to respond to messages from a network apparatus for at least a first predetermined period, when the network apparatus transmits more messages than a predetermined threshold in a second predetermined period to the registration server.

14. The registration server according to claim 10, wherein the registration server communicates with the wireless device through a radio area network (RAN) and a network.

15. The registration server of claim 10, wherein the registration server is communication with a wireless device via a base station.

16. A method for provisioning of a wireless device with a first private key generated from a device identifier of the wireless device comprising the steps of:
   receiving, at a registration server of the network, a request signal from the wireless device including a default subscriber identifier corresponding to a network selected by a user, the registration server including a second private key generated from an operator identifier assigned to the network;
   assigning, at the registration server, a subscriber identifier to the wireless device;
   transmitting, from the registration server, the subscriber identifier to the wireless device; and
   generating, at the registration server, a shared key based on the second private key and the device identifier received from the wireless device, wherein the wireless device prevents downloading machine-to-machine communications identity module (MCIM) objects from the registration server.

17. The method of claim 16, wherein a predetermined and pre-stored shared key with a network is not required.

18. A non-transitory computer readable medium, storing a computer program for causing a computer to function as:
   a storage unit configured to store an operator identifier of a network and a private key generated from the operator identifier;
   a subscriber identifier management unit configured to assign a subscriber identifier to a wireless device in response to a request signal from the wireless device;
   a communication unit configured to transmit the subscriber identifier to the wireless device; and
   a shared key generating unit configured to generate a shared key based on the private key and a device identifier received from the wireless device, wherein the wireless device prevents downloading machine-to-machine communications identity module (MCIM) objects from a registration server.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,161,215 B2 | |
| APPLICATION NO. | : 13/985459 | |
| DATED | : October 13, 2015 | |
| INVENTOR(S) | : Kato et al. | |

It is certified that error appears in the above-identified patent and that said Letters Patent is hereby corrected as shown below:

On the Title Page, in Item (56), under "OTHER PUBLICATIONS", in Column 2, Line 4, delete "2GPP" and insert -- 3GPP --, therefor.

IN THE SPECIFICATION

In Column 7, Line 17, delete "generating unit 54" and insert -- generating unit 53 --, therefor.

In Column 7, Line 21, delete "generating unit 51" and insert -- generating unit 53 --, therefor.

IN THE CLAIMS

In Column 8, Line 62, in Claim 10, delete "module, MCIM," and insert -- module (MCIM) --, therefor.

Signed and Sealed this
Twenty-third Day of February, 2016

Michelle K. Lee
*Director of the United States Patent and Trademark Office*